(12) United States Patent
Nachev et al.

(10) Patent No.: US 8,662,662 B2
(45) Date of Patent: Mar. 4, 2014

(54) CONTACT LENS FOR TREATING BINOCULAR DIPLOPIA

(75) Inventors: Parashkev Nachev, London (GB); Matthieu Pierre Alcime Robert, Nantes (FR)

(73) Assignee: Imperial Innovations Limited, London (GB)

( * ) Notice: Subject to any disclaimer, the term of this patent is extended or adjusted under 35 U.S.C. 154(b) by 323 days.

(21) Appl. No.: 12/672,006

(22) PCT Filed: Aug. 1, 2008

(86) PCT No.: PCT/GB2008/002628
§ 371 (c)(1), (2), (4) Date: Jul. 2, 2010

(87) PCT Pub. No.: WO2009/019451
PCT Pub. Date: Feb. 12, 2009

(65) Prior Publication Data
US 2010/0265458 A1    Oct. 21, 2010

(30) Foreign Application Priority Data
Aug. 6, 2007  (GB) .................................. 0715309.1

(51) Int. Cl.
*G02C 7/04* (2006.01)
*G02C 7/10* (2006.01)

(52) U.S. Cl.
USPC ............ 351/159.31; 351/159.26; 351/159.64; 351/159.73

(58) Field of Classification Search
USPC .......... 351/162, 163, 159.09, 159.24, 159.31, 351/159.6, 159.64, 159.08, 159.73, 159.74
See application file for complete search history.

(56) References Cited

U.S. PATENT DOCUMENTS

| | | | |
|---|---|---|---|
| 3,034,403 A | 5/1962 | Neefe | |
| 4,121,885 A * | 10/1978 | Erickson et al. | 351/177 |
| 4,576,453 A * | 3/1986 | Borowsky | 351/162 |
| 4,666,640 A * | 5/1987 | Neefe | 264/2.1 |
| 4,669,834 A * | 6/1987 | Richter | 351/162 |
| 4,881,805 A * | 11/1989 | Cohen | 351/161 |
| 5,056,909 A | 10/1991 | Brown et al. | |
| 5,867,247 A | 2/1999 | Martin et al. | |
| 6,305,801 B1 * | 10/2001 | Kerns et al. | 351/162 |
| 2004/0233383 A1 | 11/2004 | Sandler et al. | |
| 2006/0187409 A1 | 8/2006 | Hull | |
| 2012/0010703 A1 * | 1/2012 | Paul et al. | 623/6.17 |

FOREIGN PATENT DOCUMENTS

DE   10 2007 004 364 A1   7/2008

OTHER PUBLICATIONS

PCT Search Report (PCT/ISA/220 and 210) and Written Opinion (PCT/ISA/237) dated Nov. 25, 2008 for PCT Application No. PCT/GB2008/002628, 15 pages.

* cited by examiner

*Primary Examiner* — Jordan Schwartz
(74) *Attorney, Agent, or Firm* — Kirschstein, et al.

(57) ABSTRACT

A contact lens for treating binocular diplopia, the contact lens comprising: a central region adapted to degrade light passing therethrough, so as to create a central scotoma in a patient's eye in which the contact lens is placed in use; and a peripheral region adapted to degrade light passing therethrough to a lesser extent than in the central region, or not at all; such that, in use, an image in the field of view of the said eye is degraded only in the center or to a greater extent in the center than in the periphery. Also provided is a method of manufacturing such a lens, and a method of treating binocular diplopia comprising applying such a lens to a patient's eye.

14 Claims, 2 Drawing Sheets

CONTACT LENS FOR TREATING BINOCULAR DIPLOPIA

This application is a U.S. national phase application of PCT Application No. PCT/GB2008/002628 filed Aug. 1, 2008, which claims the priority of Great Britain patent application number GB 0715309.1 filed Aug. 6, 2007.

This invention relates to contact lenses for treating binocular diplopia.

BACKGROUND TO THE INVENTION

Binocular diplopia, otherwise known as double vision, is a visual symptom which may be brought about by any disorder which disturbs the motion of the eyes.

Two things are necessary for this symptom to emerge: first, a visual image must be perceived through each eye to a comparable (but not necessarily equal) extent; and second, the motion of the eyes must be disconjugate over at least part of the range of gaze. Any patient with normal vision in both eyes is therefore likely to develop binocular diplopia whenever a neural, muscular, or mechanical cause disturbs one or both eyeballs in a way that causes their motion to become disconjugate.

Binocular diplopia has two consequences for the patient: (a) it disrupts visual perception as a result of the interference between the two separate partly overlapping images that are perceived; and (b) it abolishes the component of the perception of depth (stereoscopic vision) that depends on the normal binocular disparity between the images in the two eyes. The effects of binocular diplopia can be particularly severe when there is relative motion between the patient and objects in the field of vision; the patient can experience dizziness and blurring of images in their field of view, and the brain's activity in trying to resolve these images can lead to headaches and mental fatigue.

Both consequences (a) and (b) above may be treated by restoring the conjugate motion of the eyes: either by removing the causative disturbance or by realigning the eyes with the aid of surgery. Alternatively, the two images may be brought into alignment with the aid of spectacle-mounted prisms that displace the image in one eye to compensate for the displacement of the eye itself.

Unfortunately, none of these treatments is universally applicable. The pathological cause is frequently irreversible; and surgery is possible only in some cases and even then only if and when the ocular motion disturbance is stable (generally at least 6 months' stability would first need to be observed). Similarly, prisms are only helpful where the deficit is fixed or changing at a rate substantially slower than that at which the patient can practically attend an orthoptic clinic; even then it often cannot cover the full range of gaze.

A great many patients therefore require an alternative approach (even if temporarily), namely, occlusion of the vision in one eye, usually the eye whose movement is (most) impaired. This is commonly done by applying a frosted plastic tape (or a clip-on occluder) on one of the two lenses of a pair of spectacles, or by fitting an eyepatch over the impaired eye, or, more rarely, by inserting a completely occlusive contact lens over the impaired eye. Since one image is abolished completely, the patient ceases to experience any perception of double vision; stereoscopic vision, however, remains lost. Understandably, patients dislike wearing eyepatches or clip-on occluders since they are visible to onlookers and may cause embarrassment.

Although very effective at abolishing diplopia, in addition to their cosmetic disadvantages, occlusive methods have a major flaw: they dramatically reduce the subject's visual field (to between 48% and 76% of the binocular visual field), necessarily so, since the vision in one eye is completely occluded. Patients are therefore less able to perceive items in the periphery of their vision on the occluded side, which can have a serious effect on their ability to interact with the immediate environment, potentially placing them at risk of accidents.

There is therefore a desire to treat binocular diplopia without substantially reducing the perception of items in the periphery of the field of vision of the occluded eye. It is estimated that about 25,000 patients annually in the UK alone would potentially benefit from better treatment in this situation.

SUMMARY OF THE INVENTION

According to a first aspect of the present invention there is provided a contact lens for treating binocular diplopia, the contact lens comprising: a central region adapted to degrade light passing therethrough, so as to create a central scotoma in a patient's eye in which the contact lens is placed in use; and a peripheral region adapted to degrade light passing therethrough to a lesser extent than in the central region, or not at all; such that, in use, an image in the field of view of the said eye is degraded only in the centre or to a greater extent in the centre than in the periphery. In preferred embodiments, the image is not degraded at all in the periphery.

Because the contact lens has a peripheral region through which light is degraded to a lesser extent than in the central region, or not at all, this avoids the consequences of the prior art techniques of complete occlusion of the impaired eye such as reduced perception of items in the periphery of the field of vision of the occluded eye.

Preferable, optional, features are defined in the dependent claims.

Thus, in certain embodiments, the central region may be adapted to block incident light, for example by reflection or, more preferably, by absorption. In the case of absorption, the central region may include dark-coloured pigment or other dark-coloured material embedded inside the lens or on a surface of the lens. Preferably the dark-coloured pigment or other dark-coloured material is in the form of a disc, preferably having a diameter in the range of 1 mm to 6 mm, and particularly preferably being approximately 3 mm in diameter.

Alternatively, or in addition, the central region may be adapted to distort incident light, for example by refraction. The central region may incorporate a domed region or pimple, or a crater or dimple, to refract incident light.

Alternatively, or in addition, the central region may be adapted to diffract incident light, for example by incorporating a diffraction grating. As those skilled in the art will appreciate, a diffraction grating may be formed from a series of closely-spaced opaque dots or opaque parallel lines.

Alternatively, or in addition, the central region may be adapted to disperse incident light. Thus, the central region may include a light-dispersing medium embedded inside the lens.

Preferably the lens is adapted to provide a high degree of degradation of light passing through the centre of the lens, and such that the degree of degradation decreases with radial distance from the centre of the lens. As a result of there being no abrupt discontinuity in the degree of degradation, this will reduce the likelihood of the patient perceiving a sharp edge within his field of vision.

The degree of degradation may decrease smoothly with radial distance from the centre of the lens, although alternatively the degree of degradation may decrease in discrete steps with radial distance from the centre of the lens.

As well as being arranged to treat treating binocular diplopia, the contact lens may be shaped to treat, using refractive correction, one or more conventional optical disorders, such as myopia, hypermetropia/hyperopia, astigmatism or presbyopia.

If desired, the contact lens may also be opaque or coloured, to reduce the intensity of light passing therethrough, and/or to change the perceived iris colour of the patient's eye.

According to a second aspect of the present invention there is provided a method of manufacturing a contact lens.

According to a third aspect of the present invention there is provided a method of treating binocular diplopia, comprising applying a contact lens according to the first aspect of the invention to a patient's eye. The term "patient" as used herein should be interpreted broadly, to encompass anyone afflicted by binocular diplopia, without necessarily having been admitted for treatment by a medical practitioner.

With all the aspects of the invention, preferable, optional, features are defined in the dependent claims.

BRIEF DESCRIPTION OF THE DRAWINGS

Embodiments of the invention will now be described, by way of example only, and with reference to the drawings in which.

In the figures, like elements are indicated by like reference numerals throughout.

DETAILED DESCRIPTION OF PREFERRED EMBODIMENTS

The present embodiments represent the best ways known to the applicants of putting the invention into practice. However, they are not the only ways in which this can be achieved.

The present embodiments will be described with respect to human patients and human eyes.

It has been found that patients are much less aware of diplopia in the periphery of their field of vision, partly because part of the peripheral visual fields are non-overlapping anyway, but mostly because the spatial resolution of peripheral vision is too low. This is because the properties of the visual receptors change across the visual field: those in the centre, and particularly those in the fovea, have a high spatial resolution and relatively low light sensitivity, whereas those in the periphery have low spatial resolution and high light sensitivity. The difference between the centre and periphery is very marked indeed, as indicated by the black line in FIG. 3. Importantly, the perception of diplopia is dependent on the superposition of two high-resolution images: it is therefore unlikely in the periphery where the resolution is too low.

Thus, to abolish the perception of double vision we have found that we need only degrade the quality of vision in the centre of vision in one eye (typically the eye whose movement is (most) impaired), leaving the periphery intact in both eyes. In essence, we are creating an artificial central visual defect—what is termed clinically a "central scotoma"—in one eye.

Figure 1:
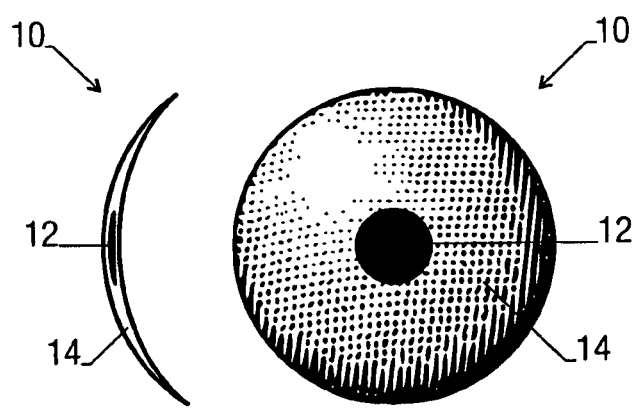
FIG. 1 illustrates a cross-sectional side view and a plan view of a contact lens according to a first embodiment of the invention.
Figure 2:
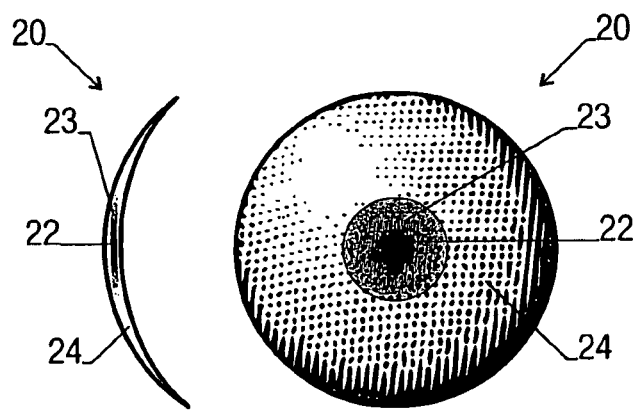
FIG. 2 illustrates a cross-sectional side view and a plan view of a contact lens according to a second embodiment of the invention.
Figure 4:
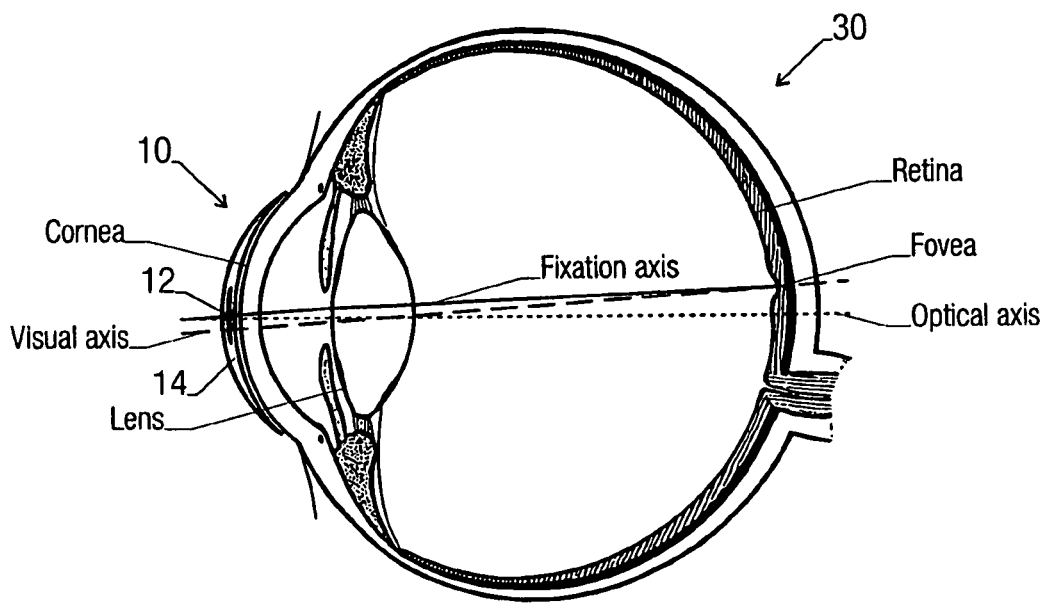
FIG. 4 illustrates a schematic cross-section through a human eye, with a contact lens according to the first embodiment of the invention in place.

According to the present embodiments and as illustrated in FIGS. 1, 2 and 4, this is achieved by a contact lens 10 having a central region 12 adapted to degrade light passing therethrough, so as to create a central scotoma; and a peripheral region 14 adapted to degrade light passing therethrough to a lesser extent than in the central region, or not at all; such that an image in the field of view of the eye 30 is degraded only in the centre or to a greater extent in the centre than in the periphery. Such an arrangement allows us to have the universal applicability and great efficacy of occlusion without its major drawback of reduced perception of items in the periphery of the field of vision.

To achieve the perceptual effect of a central scotoma it is necessary to degrade the quality of the visual image selectively in the centre of vision using what may be termed a "foveal occlude", leaving the periphery substantially intact. This principle is fundamentally different from occlusive contact lenses known in the prior art, which are occlusive across the entire range of the visual field.

Two major factors will be considered first: the method of degradation, and the parameters of the gradient of degradation across the eye.

1. Method of Degradation

The purpose of our device is to selectively degrade the visual quality of the centre of the image in one eye so that only one image is perceived by the subject when viewing the scene with both eyes open. Simply attenuating the light intensity in the central region (as in U.S. Pat. No. 3,034,403) will not degrade the visual image because the patient's visual system will automatically adjust its gain resulting in a visual image of normal sharpness. Indeed, the purpose of the device described in U.S. Pat. No. 3,034,403 is to reduce the need for the visual system to change gain so as to improve the quality of the image, not to degrade it as we do.

In order to degrade the quality of the image we either block the light falling on the fovea on which the image principally depends, or distort it so that the image on the fovea only poorly represents the object that is viewed. Since the visual system is most sensitive to changes of high spatial frequency (i.e. edges), the optimum kind of distortion would be one that blurs the image heavily, otherwise the distorted image will itself be perceived to some extent, leading to interference. Degradation of the image may be achieved by either of these two means, namely either blocking the light or distorting it.

Thus, the central image may be degraded by any suitable technique to block or distort incoming light, such as absorption, refraction, reflection, dispersion, or diffraction. The aesthetic appearance is likely to be best when absorption or refraction are used, since in the other cases at least some of the light will be reflected back from the lens, revealing the presence of an opacity in the eye to a third party observer. Nonetheless any of these methods is practically feasible and will produce a similar perceptual effect in the subject. Here we describe the first two methods only, namely absorption and refraction. There is no reason why these two methods cannot be combined, and indeed further embodiments may be produced by combining them.

a) Absorptive Method

As illustrated in FIG. 1, a soft contact lens 10 may be produced in which black or dark-coloured pigment, or some other black or dark-coloured material, is inserted within the substance of the lens, in the central region 12 of the lens. Alternatively, black or dark-coloured pigment, or some other black or dark-coloured material, may be deposited on, or otherwise attached to, the surface of the lens, in the central region of the lens. The extent and concentration of pigment or dark material may be determined as outlined below.

The function of the pigment or dark material is to absorb most of the incident light, such that the light reaching the centre of the patient's eye is insufficient to convey a well-formed image, thereby degrading the image perceived in the centre of the field of view of that eye.

Although a hard contact lens having such a pigmented region may also be produced, soft contact lenses are preferred, since they provide better adhesion to the surface of the patient's eye. The other parameters of the lens are chosen so as to minimize movement of the lens relative to the eye.

A contact lens incorporating a foveal occluder may be refractively neutral, or may be shaped so as to correct any refractive error appropriately, in the manner of prescription contact lenses. If refractive correction is required, two contact lenses may be used, although only one will incorporate a foveal occluder. In other cases only one contact lens (which will incorporate a foveal occluder) will be required. If the patient normally wears spectacles, no additional refractive correction will be needed in the occluded contact lens, since the spectacles will perform the necessary refractive correction.

b) Refractive Method

Here the technology of progressive contact lenses is used, except that the difference between the centre and the periphery is much greater than usual and the refractive correction is aimed at reducing visual acuity at the centre rather than improving it. A 6 dioptre difference from the patient's prescription is suggested at the centre, with the gradient of refractive difference falling off as described below. In practice, this may be implemented as an outwardly-protruding domed region or pimple in the centre of the contact lens. A crater or dimple in the centre of the contact lens would also be suitable for this purpose, but would be anticipated to be less effective than a dome or pimple.

This refractive method for producing foveal occlusion may also be combined with refractive correction as discussed above.

As mentioned above, alternative methods for blocking or distorting incident light include incorporating reflective means (e.g. a mirrored disc) on or within the central region of the lens, or by incorporating a diffraction grating on or within the central region of the lens. As those skilled in the art will appreciate, a diffraction grating may be formed from a series of closely-spaced opaque dots or opaque parallel lines.

2. Gradient of Degradation

Conventional occlusive contact lenses abolish or degrade the quality of vision across the entire visual field. Other devices designed for other purposes, such as that described in U.S. Pat. No. 5,056,909, abolish or degrade the quality of vision uniformly across all of the functionally significant visual field. We have seen that in relation to the treatment of binocular diplopia this is both unnecessary and undesirable. The functional utility of vision in any part of the visual field is dependent on the acuity at that point of the visual field: the greater the acuity the greater the functional utility. When the eyes are misaligned, the probability of experiencing binocular diplopia in any part of the visual field is also proportional to the acuity. The challenge therefore is to find a spatial pattern of degradation across the visual field such that the degree of degradation at any eccentricity is directly proportional to the visual acuity at that specific eccentricity, but no more so than is required to abolish the perception of diplopia, thereby maximising the extent of functionally significant visual field that is left undegraded or only weakly degraded.

Figure 3:
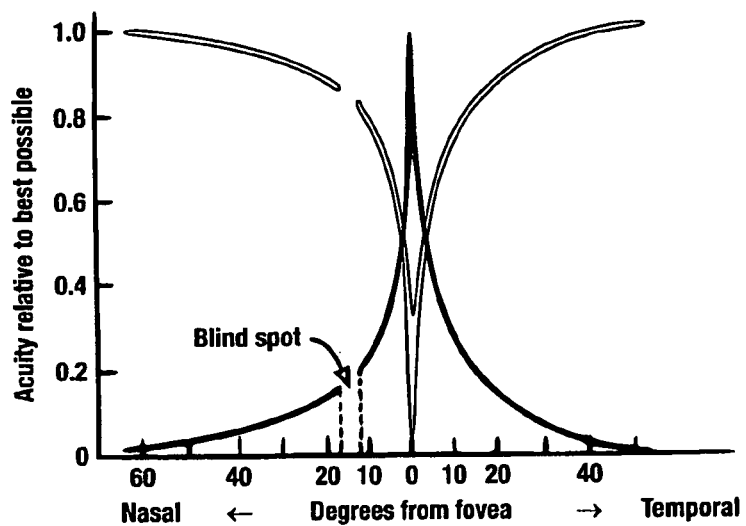
FIG. 3 illustrates the variation in visual acuity of a human eye, plotted against the angle from the fovea (the black line), and a preferred pattern of light transmission across the visual field (the white line) for the embodiments of the invention.

Thus, as illustrated in FIG. 3, the optimal pattern of light transmission across the visual field (as indicated by the white line) is approximated by the inverse of the pattern of visual acuity depicted by the black line, with the region of maximum acuity corresponding to complete degradation of the image. Two major things limit our ability (and desire) to approach this ideal.

First, since contact lenses are not absolutely fixed but normally move in relation to the cornea by 1-2 mm, the gradient of degradation—if perfectly matched to the normal acuity function—may make this movement perceptible to the subject, which would be unpleasant. So as to compensate for this movement, our function therefore is preferably smoother and broader in the centre by approximately 3.5° to 7° of visual angle.

Second, any foveal occluder will interact to some degree with the pupil in two ways: first, the gradient of change in retinal illumination with pupillary size will both increase and become less linear; and second, the edges of the occluder and the pupil will generate diffraction effects. Thus the degradation function may only be ideal for a relatively narrow range of pupil diameters. However, the tendency for these effects generally would be to increase the amount of degradation when the ambient illumination is high and to decrease it when it is low, which would mirror the changes in contrast sensitivity in the normal state. They are therefore not undesirable.

Given that the acuity function is relatively flat beyond about 15° eccentricity (see FIG. 3) it may in any case be unnecessary to mirror it precisely. A simple, wholly opaque disc covering 15° of eccentricity from the centre will be smoothed by diffraction effects to a sufficient approximation, given the acuity in these regions. Such a disc will preferably be approximately 3 mm in diameter, centred on the fixation axis (based on a standard eye model with cornea-nodal point distance of 5.55 mm and nodal point to retina distance of 16.67 mm). Such a device is depicted in FIGS. 1 and 4 (not to scale).

Since the size of the disparity between the two images will impinge on the minimal spatial resolution required to resolve them, the disparity could be used to modulate the size of the central scotoma. Thus for small disparities a smaller scotoma may be sufficient. Since visual acuity falls off very sharply from the centre, as illustrated by the black line in FIG. 3, the centre of the contact lens may be adapted to degrade light to a high extent whilst, moving radially away from the centre of the lens, the degree of degradation can be progressively lessened. It is envisaged that progressively lessening the degree of degradation over a few discrete steps would offer sufficient flexibility.

Our ability to modulate the gradient of light degradation is limited by the proximity of the contact lens to the refractive apparatus of the eye. Diffraction at the edges of any opacity will inevitably blur its representation on the retina—creating a much smoother gradient than the opacity gradient of the contact lens itself. The parameters will therefore need careful adjustment.

The size of the scotoma will also partly depend on the size of the pupil, which depends mainly on the intensity of the ambient illumination. Fortunately, such modulation will be in the same direction as visual acuity, and therefore will not interfere substantially with the function of the device.

A range of contact lenses incorporating foveal occluders may be made, having different sizes of foveal occluders to suit the patient and the extent of the central scotoma that is required. For example, contact lenses may be made incorporating different sizes of foveal occluder discs, the discs being in the range of from 1 mm to 6 mm in diameter.

3. Optimizing the Foveal Occluder

The degradation achieved with an opaque disc results from blocking the light normally accurately focussed on the fovea and distorting the light passing around the edges of the occluder by diffraction effects. A closer approximation to the ideal pattern may be achieved by introducing a strongly light-dispersing medium in the substance of the contact lens and reducing its relative proportion with increasing radial eccentricity over a radius of approximately 5 mm. The light dispersion will degrade the image in proportion to the proportion of dispersant in the substance of the lens. Note that since the dispersant does not simply reflect the light but scatters it in a disorganised manner the image will not simply be attenuated in contrast or intensity (as in U.S. Pat. No. 3,034,403) but blurred to a different extent.

Thus, as illustrated in FIG. 2 (not to scale), in a further embodiment, a contact lens 20 may have more dispersant in the centre 22 than in the immediate periphery 23, in a manner that thereby achieves a smoother gradient of image degradation across the visual field than may be achieved by a occluder with an abrupt edge.

Since the dispersant will appear white to external observers, the surface of the contact lens 20 may be coloured dark in the centre (to simulate the pupil), and an appropriate colour in the region around the centre (to simulate the iris). This will globally reduce the illumination into that eye to some extent but this will be beneficial for the effect we are seeking. As with the embodiment of FIG. 1, the peripheral region 24 is adapted to degrade light passing therethrough to a lesser extent than in the central region, or not at all.

As illustrated in FIG. 4, the optical axis of the human eye 30 is not exactly aligned with the fixation axis. There is approximately 5° of misalignment between these two axes. Accordingly, if one were striving for an even more precise treatment for binocular diplopia, a lens could be made in which the foveal occluder is about 5° off-centre, such that the point of occlusion at the back of the eye coincides exactly with the position of the fovea. However, in practice, such a lens would generally be undesirable, since it would be necessary to insert it into the eye at the correct orientation, it would need to be well-centred in the eye, and it would need to move very little and not rotate during use.

Therefore, in practice, it is generally preferable for the foveal occluder to be positioned in the centre of the lens, since this position is more tolerant of rotation and lateral movement of the lens in the eye. With regard to lateral movement, contact lenses typically only move around by about 1-2 mm during use, and so the foveal occluder can be of a relatively small size (as described above) and yet remain effective for its purpose.

4. Variants

Features of any existing contact lenses are compatible with the foveal occluder, apart from features which seek to increase the amount of light transmitted through the central region of the lens, since this would be contrary to the operation of the present invention. The following variants are all based around a contact lens incorporating a foveal occluder as described above.

As well as providing a foveal occluder, the contact lens may also be adapted to treat optical disorders such as myopia (short-sightedness), hypermetropia/hyperopia (long-sightedness), astigmatism, or presbyopia (inability to focus on close objects).

The contact lens may be of the so-called "progressive" kind, having a variable focal length.

Additionally, or alternatively, the contact lens may be opaque or coloured, to dim the intensity of light passing therethrough, and/or to change the perceived iris colour of the patient's eye for cosmetic purposes.

5. Contact Lens Material

Contact lenses incorporating a foveal occluder may be manufactured using the polymer materials that are used to make existing soft contact lenses. Such polymer materials give good adhesion to the eye, and advantageously may be breathable (i.e. oxygen-permeable).

Alternatively, contact lenses incorporating a foveal occluder may be made using hard materials, such as hard plastics or glass, but these are less preferred than the soft polymer materials mentioned above.

6. Method of Manufacture

Contact lenses incorporating a foveal occluder may be manufactured by adapting existing contact lens manufacturing techniques. For example, existing techniques for manufacturing coloured contact lenses (in which pigment is applied to the periphery of the lens) may readily be adapted to manufacture the present embodiments which use black or dark-coloured pigment in order to provide absorption of incident light. For those lenses which incorporate black or dark-coloured pigment within the substance of the lens (e.g. the lenses shown in FIGS. 1, 2 and 4), the pigment may be injected into the centre of the lens material, in the central region of the lens.

Alternatively, in a more basic sense, an existing contact lens may be adapted by depositing or otherwise attaching black or dark-coloured pigment, or some other black or dark-coloured material, onto the surface of the lens, in the central region of the lens.

To manufacture the embodiments which use refraction to produce foveal occlusion, the mould in which the lens is formed may be adapted to incorporate a dome, dimple or crater in the central region of the lens. The same result may be achieved by producing the contact lens using a lathe or robotic process.

The invention claimed is:

1. A contact lens for treating binocular diplopia, the contact lens comprising:
    a central region that distorts light passing therethrough, so as to create a central scotoma in a patient's eye in which the contact lens is placed in use; and
    a peripheral region that distorts light passing therethrough to a lesser extent than in the central region, or not at all;
    such that, in use, an image in the field of view of an eye is distorted only in the center or to a greater extent in the center than in the periphery;
    the contact lens providing a high degree of distortion of light passing through the center of the lens, and such that the degree of distortion progressively decreases with radial distance from the center of the lens only in the central region.

2. A contact lens as claimed in claim 1, wherein the central region refracts incident light.

3. A contact lens as claimed in claim 2, wherein the central region incorporates a domed region or pimple, or a crater or dimple, to refract incident light.

4. A contact lens as claimed in claim 1, wherein the central region diffracts incident light.

5. A contact lens as claimed in claim 4, wherein the central region incorporates a diffraction grating.

6. A contact lens as claimed in claim 5, wherein the diffraction grating comprises a series of closely-spaced opaque dots or a series of closely-spaced opaque parallel lines.

7. A contact lens as claimed in claim 1, wherein the central region disperses incident light.

8. A contact lens as claimed in claim 7, wherein the central region includes a light-dispersing medium embedded inside the lens.

9. A contact lens as claimed in claim 1, wherein the degree of distortion decreases smoothly with radial distance from the center of the lens.

10. A contact lens as claimed in claim 1, wherein the degree of distortion decreases in discrete steps with radial distance from the center of the lens.

11. A contact lens as claimed in claim 1, further being shaped to treat, using refractive correction, one or more conventional optical disorders selected from the group consisting of myopia, hypermetropia/hyperopia, astigmatism and presbyopia.

12. A contact lens as claimed in claim 1 being opaque or colored, to reduce the intensity of light passing therethrough, and/or to change the perceived iris color of the patient's eye.

13. A method comprising treating binocular diplopia by applying a contact lens as claimed in claim 1 to a patient's eye.

14. A method of manufacturing a contact lens for treating binocular diplopia, the method comprising:
  forming a central region of the lens such that, in use, it distorts light passing therethrough, to create a central scotoma in a patient's eye in which the contact lens is placed; and
  forming a peripheral region of the lens such that, in use, it distorts light passing therethrough to a lesser extent than in the central region, or not at all;
  such that, in use, the contact lens provides a high degree of distortion of light passing through the center of the lens, and that the degree of distortion progressively decreases with radial distance from the center of the lens only in the central region.

* * * * *